United States Patent
Ladera Sainz et al.

(10) Patent No.: US 6,572,800 B1
(45) Date of Patent: Jun. 3, 2003

(54) PROCESS AND APPARATUS FOR PRODUCING FOAM

(75) Inventors: Jesús Ladera Sainz, El Pla de Santa Maria (ES); Laura Figueras Nadal, El Pla de Santa Maria (ES)

(73) Assignee: Poliglas, S.A., Barbera de Valles (ES)

( * ) Notice: Subject to any disclaimer, the term of this patent is extended or adjusted under 35 U.S.C. 154(b) by 0 days.

(21) Appl. No.: 09/807,914

(22) PCT Filed: Jan. 5, 2000

(86) PCT No.: PCT/ES00/00002

§ 371 (c)(1),
(2), (4) Date: Apr. 20, 2001

(87) PCT Pub. No.: WO00/43444

PCT Pub. Date: Jul. 27, 2000

(30) Foreign Application Priority Data

Jan. 20, 1999 (ES) .............................................. 9900099

(51) Int. Cl.$^7$ .......................... B29C 44/20; B29C 44/34
(52) U.S. Cl. .......................... 264/50; 264/53; 425/4 C; 425/817 C
(58) Field of Search .................... 264/50, 53; 425/4 C, 425/817 C

(56) References Cited

U.S. PATENT DOCUMENTS

| | | | | |
|---|---|---|---|---|
| 4,211,739 A | * | 7/1980 | Phipps ........................ 264/51 |
| 4,436,679 A | | 3/1984 | Winstead .................... 264/40.3 |
| 5,082,608 A | * | 1/1992 | Karabedian et al. ......... 425/4 C |
| 5,158,986 A | | 10/1992 | Cha et al. ..................... 521/82 |
| 5,244,927 A | | 9/1993 | Binder et al. ................. 521/79 |
| 5,250,577 A | | 10/1993 | Welsh .......................... 521/79 |
| 5,269,987 A | | 12/1993 | Reedy et al. ................. 264/50 |
| 6,113,374 A | * | 9/2000 | Brackman et al. .......... 425/4 C |
| 6,174,471 B1 | * | 1/2001 | Park et al. ..................... 264/53 |

FOREIGN PATENT DOCUMENTS

| | | |
|---|---|---|
| DE | 3943265 A1 | 7/1991 |
| EP | 0318846 A2 | 6/1989 |
| EP | 0411923 A2 | 2/1991 |
| EP | 0464581 B1 | 1/1992 |
| EP | 0528536 A1 | 2/1993 |
| EP | 0597375 A1 | 5/1994 |
| GB | 1220053 | 1/1971 |
| GB | 1230992 | 5/1971 |
| WO | WO93/22371 | 11/1993 |

\* cited by examiner

*Primary Examiner*—Allan R. Kuhns
(74) *Attorney, Agent, or Firm*—Jacobson Holman PLLC

(57) ABSTRACT

$CO_2$ is used as the blowing agent, and a first and second control agents are injected into the melt, the first control agent being designed to dissolve and cool the melt and consisting of ethanol, while the second control agent is only designed to cool the melt and consists of $H_2O_2$, the injected amount of ethanol being just sufficient for achieving the highest possible dissolution of $CO_2$ in the melt and the injected amount of $H_2O_2$ being such that the foaming produced by ethanol is minimized. The apparatus includes arrangements for conditioning and feeding the blowing agent and control agents into the melt. The blocks and boards exhibit dimensional stability and good self-extinction features.

13 Claims, 1 Drawing Sheet

PROCESS AND APPARATUS FOR PRODUCING FOAM

FIELD OF THE INVENTION

The invention relates to a process and an apparatus for producing polystyrene foam, as well as foam blocks and boards (such as plates and panels) produced therewith.

BACKGROUND OF THE INVENTION

Of particular relevance in this technical field are GB-A-1,220,053 and GB-A-1,230,992 of Imperial Chemical Industries Limited (ICI). Prior to the date of application of said British patents, foaming tests of synthetic resins using substantially inert inorganic gases, especially $CO_2$, had already been carried out. These tests did not give the desired results, at least not for foam thicknesses of more than a few mm, owing mainly to the low solubility of $CO_2$ in the polymeric mixture or melt to be foamed, which made it necessary to operate at high pressures throughout the process (resulting in higher costs), giving rise to high temperatures, with the result that the temperature of the melt at the time of the final extrusion to the atmosphere (below, "final extrusion") is too high to allow the foam features to be controlled properly; moreover, the polymeric mixture may be subject to thermal degradation. As a result, a foam of very high density is obtained, and foam boards of commercial grade can only be achieved for thicknesses in the order of a few mm, since it is not possible to incorporate in the melt the amount of $CO_2$ necessary for obtaining greater thicknesses.

Said documents GB-A-1,220,053 and GB-A-1,230,992 established, toward the end of the 1960s, the general basis for producing specific synthetic resin foams, including those of polystyrene. Particularly, GB-A-1,220,053 describes "a process for the production of foamed thermoplastic polymers in which the pressure is released from a pressurised homogeneous mixture of the molten thermoplastic polymer and a blowing agent system, said system comprising a first blowing agent which is completely miscible with the molten thermoplastic polymer at the said pressure and which is a solvent for said thermoplastic polymer under the conditions of temperature and pressure of the homogeneous mixture and a second different blowing agent which has a solubility of at least 0.01% by weight in the thermoplastic polymer and a critical temperature less than the temperature of the homogeneous mixture at the point when said pressure is released, said first blowing agent having a boiling point 10° C. or more below said temperature of the mixture" (claim 1). Moreover, it clearly states that the process can be applied to the foaming of "polystyrene" (page 1, col. 2, line 53), that "the first and the second blowing agents are selected so that they are inert with respect to the thermoplastic polymer under the pressure and temperature conditions of the pressure vessel" (page 2, col. 1, lines 40–44), that "the most suitable substances for use as the first blowing agent are liquids whose boiling points at atmospheric pressure are greater than room temperature" (page 2, col. 2, lines 69–72), that "ethanol" can be used as the first blowing agent (page 2, col. 2, line 83), that it was found that "carbon dioxide" (page 3, col. 1, line 17) is a substance which can be used as the second blowing agent, that it is preferable to use "as much of the second gaseous blowing agent ($CO_2$) as possible", but stating that this amount of $CO_2$ is usually less than 10% by weight (page 3, col. 1, lines 29–34), and suggesting that, in fact, the foaming produced by the first blowing agent (for example, ethanol) alone may give rise to a small number of very large bubbles or cells, which is detrimental to the commercial value of the product (page 3, column 1, lines 10–14).

In the years following the filing date of said ICI patents, manufacturers tended more and more towards using halocarbon blowing agents (also foreseen in said British patents), either alone or in various mixtures. However, for environmental reasons, since the 1980s, attempts have been made to decrease the use of halocarbon blowing agents and everything points to the increased use of $CO_2$ as the main blowing agent. From among the patent documents reflecting these trends, the following may be mentioned: WO 93/22371, EP-A-0 318 846, EP-A-0 411 923, EP-A-0 464 581, EP-A-0 597 375, DE 39 43 265 A1, U.S. Pat. No. 5,158,986, U.S. Pat. No. 5,244,927, U.S. Pat. No. 5,250,577 and U.S. Pat. No. 5,269,987, some of them also involving the use of ethanol as "blowing agent".

Apparatuses of the general kind defined in preamble of present claim 7 are know from EP-A-0 528 536 and U.S. Pat. No. 4,436,679.

As may be gathered from said patent documents of ICI, it would be ideal to work with a single blowing agent, namely $CO_2$. However, its low solubility in the polymer and the other drawbacks referred to above make it necessary to use $CO_2$ in conjunction with other different agents which below that of the polymer melt at the moment of the final extrusion will inevitably have, to a greater or lesser extent, a foaming effect, and in that sense such an agent can qualify as a ?blowing agent?, as is done, for example, in said patent documents of ICI when referring to the "first blowing agent". However, especially when the agents employed jointly with $CO_2$ are lower alcohols, the foaming effects (inevitably) produced are in general undesirable, owing to the fact that they tend to give irregular bubbles or cells of which large-sized and/or open ones predominate, rather than cells with the desired features produced by using the proper blowing agent, i.e. $CO_2$. For this reason, agents other than $CO_2$ will not be referred to in the present specification as "blowing agents" but as "control agents" since, rather than being used for foaming, they are used for enabling the foaming produced basically by the proper blowing agent ($CO_2$) to proceed adequately.

The present inventors have confirmed through experiments that ethanol acts as a solvent for polystyrene, thereby reducing the viscosity of the melt, making it possible to work at lower pressures along the entire production line, including the final extrusion head, while using the same amount of $CO_2$ incorporated in the melt. A decrease in the viscosity also results in a decrease in both the internal friction of the melt and its friction with the mechanical components it makes contact with and, as a result of this, in a decrease in the temperature of the melt, which is of special importance near the die of the final extrusion head. The present inventors have also confirmed through experiments the beneficial effects of ethanol, by virtue of absorbing heat from the melt when the foaming occurs.

However, the experiments carried out by the present inventors using ethanol as control agent for the foaming, mainly produced by $CO_2$, have also revealed its drawbacks, which chiefly consist of the fact that the foams obtained using ethanol take a considerable amount of time to reach he final value of some of their physical properties which are considered critical, such as their high-temperature dimensional stability, compression strength, and behaviour towards fire or self-extinction capacity, and that (as already stated) ethanol tends to produce foaming with large and open cells.

The aim of the present invention is to overcome these drawbacks.

The inventors have found that where ethanol is used as control agent for the foaming produced by $CO_2$ the best foam features are obtained if the minimum amount of ethanol is added, just sufficient to give to the melt the proper viscosity for absorbing the highest possible amount of $CO_2$, and to keep the foaming produced by ethanol at the minimum possible amount.

Moreover, the inventors have found that this reduction in the amount of ethanol used would by itself have the potential drawback of making it difficult to achieve the required decrease in temperature, since one of the effects of ethanol is to act as coolant of the melt. In order to avoid this drawback, the inventors propose the use of a second control agent consisting of $H_2O_2$ which is added to the melt subsequent to the addition of ethanol.

The fact that $H_2O_2$ does not dissolve polystyrene and therefore does not modify its features has the effect that the physical properties of the foam are maintained or improved and that the foam can be obtained with greater thicknesses than when using ethanol alone as the control agent for controlling the foaming produced by $CO_2$. The use of a much smaller amount of ethanol allows that said physical properties which are considered critical (dimensional stability, strength and self-extinction capacity) are achieved more rapidly.

Bearing in mind the foregoing, the invention provides, according to a first aspect, a process for producing polystyrene foam, in the initial step of which process a mixture of polystyrene with customary nucleating agents, plasticisers and additives is plastified at a pressure and temperature respectively above atmospheric pressure and room temperature in order to form a melt, which is suddenly decompressed and cooled to atmospheric pressure and room temperature, on being extruded through a final extrusion die, in which process a blowing agent designed to produce the desired foaming and only consisting of $CO_2$ is injected into the melt so that said blowing agent is dissolved in the melt, in which process a first and a second control agent are also injected into the melt, the first control agent being designed to dissolve and cool the melt and consisting of ethanol, while the second control agent is only designed to cool the melt and consists of $H_2O_2$, the injected amount of ethanol being such that it is just sufficient for achieving the highest possible dissolution of $CO_2$ in the melt, and the injected amount of $H_2O_2$ being such that the foaming produced by ethanol is minimised.

According to an optional feature, the ethanol is injected into the immediate proximity of the injection point of $CO_2$ and the $H_2O_2$ is injected downstream from that point, when the injections of the blowing agent and the ethanol have already partially cooled the melt.

According to another optional feature, immediately before the final extrusion, the melt to be extruded comprises 2.25–5% by weight of $CO_2$, 0.3–3.0% by weight of ethanol and 0.2–1.7% by weight of $H_2O_2$, the remainder being polystyrene and customary nucleating agents, plasticisers and additives.

According to another optional feature, immediately before the final extrusion, the melt to be extruded comprises 3.0–4.0% by weight of $CO_2$, 0.6–1.25% by weight of ethanol and 0.25–1% by weight of $H_2O_2$, the remainder being polystyrene and customary nucleating agents, plasticisers and additives.

According to another optional feature, the temperature and pressure profiles of the process are kept at decreasing temperature values in the range of 200 to 100° C. and at decreasing pressure values in the range of to 7.6 MPa (about 200 to 76 bar), respectively, $CO_2$ always being maintained under supercritical conditions until the final extrusion.

According to another optional feature, the polystyrene has a molecular weight of less than about 150,000, a melt flow index of about 20 g/10 min (ISO 1133H) and a VICAT VST B 50 (according to ISO 306 B 50) softening temperature above 100° C.

According to another aspect, the invention provides an apparatus for carrying out the above defined process, which comprises a kneader-extruder and a dynamic mixer arranged in series, the first of which comprises means for effecting the initial plastifying of the mixture into a melt and the injection of $CO_2$ and ethanol, and the second of which is provided with a cooling device and feeds the melt into an extrusion head which carries the final extrusion die, there being means for the injection of $H_2O_2$, between the kneader-extruder and the dynamic mixer, in which apparatus a first static mixer and a second static mixer are inserted respectively immediately downstream of the kneader-extruder and immediately downstream of the dynamic mixer, and the means for the injection of $H_2O_2$ are arranged between the kneader-extruder and the first static mixer.

According to another optional feature, the apparatus comprises, upstream from the kneader-extruder, a first tank for receiving $CO_2$ from an external source, the first tank being maintained under pressure and temperature conditions of the same range as those of the external source, a second tank for $CO_2$ in which this is maintained under a pressure of about 7 MPa (about 70 bar) and at ambient or room temperature, and an injection pump for pumping $CO_2$ from the second tank and injecting it into the kneader-extruder and capable of raising the pressure of $CO_2$ from about 7 MPa (about 70 bar) to about 30 MPa (about 300 bar).

According to another optional feature, the flow of $CO_2$ from the first tank to the second tank is effected by means of another pump, downstream of which a heating device is provided which raises the temperature of the $CO_2$ leaving the another pump to about ambient or room temperature.

According to another optional feature, the flow of $CO_2$ between the second tank and the injection pump passes through a cooling device which lowers the temperature of $CO_2$ to prevent it from being overheated during the pumping operation.

According to another optional feature, the injection pump is a cooled one.

According to another optional feature, the cooling of the injection pump is effected by cooling the pump head.

According to another optional feature, the process is carried out in an apparatus such as the one defined in the immediately preceding paragraphs and comprises the steps of:

a) plastifying into a melt a mixture of polystyrene with customary nucleating agents, plasticisers and additives in the kneader-extruder, the polystyrene having a molecular weight of less than about 150,000, a melt flow index of about 20 g/10 min (ISO 1133H) and a VICAT VST B 50 (according to ISO 306 B 50) softening temperature above 100° C.;

b) injecting into the melt, in the kneader-extruder, $CO_2$ on the one hand and ethanol on the other hand, at a pressure of about 20 MPa (about 200 bar);

c) transferring the melt from the kneader-extruder to the first static mixer and injecting $H_2O_2$ into the melt between the kneader-extruder and the first static mixer;

d) homogenising the melt in the first static mixer;

e) transferring the melt from the first static mixer to the dynamic mixer in which homogenisation is accompanied by a decrease in the temperature and the pressure to which the melt is subjected;

f) transferring the melt from the dynamic mixer to the second static mixer, in which the decrease in the temperature and the pressure to which the melt is subjected continues;

g) transferring the melt from the second static mixer to the final extrusion head, in which the temperature and pressure are controlled so that they remain close to about 100° C. and 7.6 MPa (about 76 bar), respectively, the $CO_2$ always being maintained under supercritical conditions until the final extrusion;

the operative conditions being such that at the time of the final extrusion, the melt comprises 2.25–5% by weight of $CO_2$, 0.3–3.0% by weight of ethanol and 0.2–1.7% by weight of $H_2O_2$, the remainder being polystyrene and customary nucleating agents, plasticisers and additives, that the blocks or boards produced, 42 days after their production and after having been subjected to heating at 70° C. for 2 days, have undergone a decrease in each of their linear dimensions (length, width and thickness) of less than 5% with regard to the original dimension, and that the test for determining the self-extinction coefficient, carried out on said blocks and boards one hour after they have been extruded, gives a flame height of less than 11 cm.

According to another aspect, the invention provides foam blocks and boards produced using the above mentioned process or apparatus, characterized in that 42 days after their production and after having been subjected to heating at 70° C. for 2 days they have undergone a decrease in each of their linear dimensions (length, width and thickness) of less than 5%, with regard to the original dimension.

According to another optional feature of the blocks and boards according to the invention, the test for determining the self-extinction coefficient, carried out on said blocks and boards one hour after they have been extruded, gives a flame height of less than 11 cm.

BRIEF DESCRIPTION OF THE DRAWINGS

Other features, objects and advantages will be apparent from the remainder of the description which follows after it has been read in conjunction with the attached drawings, in which.

DETAILED DESCRIPTION OF THE PREFERRED EMBODIMENTS

Figure 1:
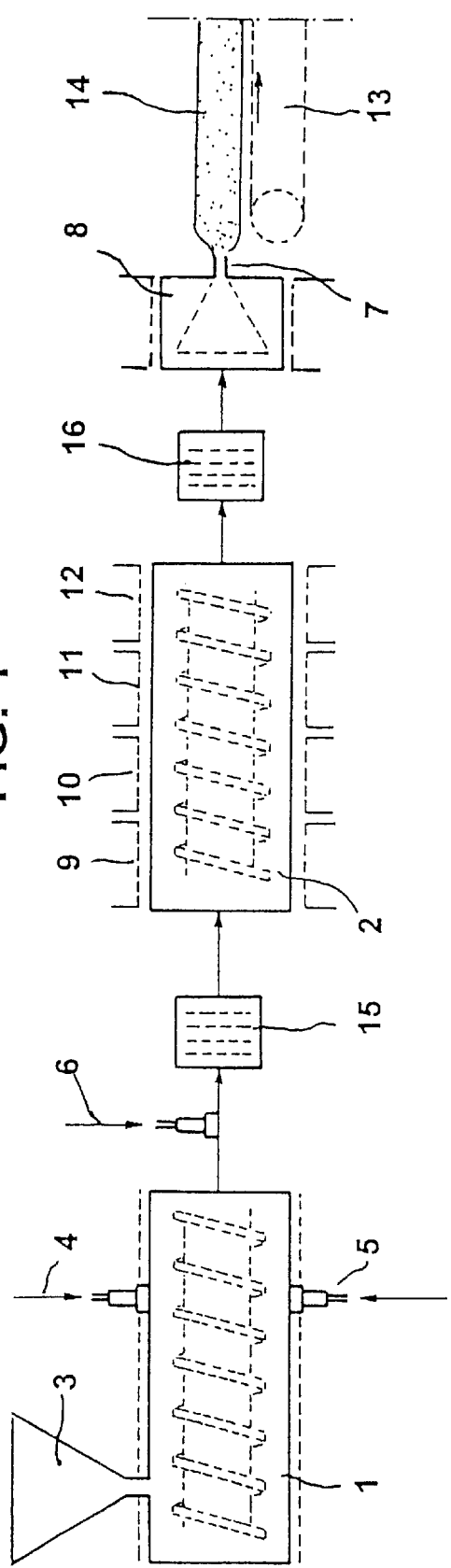
FIG. 1 shows a very schematic view of an apparatus in which the process according to the invention is carried out and FIG. 2 shows an also schematic view of the $CO_2$ conditioning and feeding arrangements in the same apparatus.

Firstly with reference to FIG. 1, the apparatus comprises a kneader-extruder 1 and a dynamic mixer 2, arranged in series or tandem.

The kneader-extruder 1 receives the initial charge of polystyrene and customary nucleating agents, plasticizers and additives, as shown schematically by means of feed hopper 3, which feeds said initial charge or mixture into the kneader-extruder 1 which plastifies and homogenises it into a melt (in fact, the plastification and the homogenisation of melt proceed continuously through the apparatus until immediately before the final extrusion). The general structure of the kneader-extruder 1 is that of a conventional plastifying apparatus and it is designed to work at pressures above 20 MPa (about 200 bar) and at temperatures above 225° C. In this embodiment of the invention, the kneader-extruder 1 is further equipped with injection devices 4 and 5, for $CO_2$ and ethanol, respectively, at temperatures near room temperature and at pressures in the order of 20 MPa (about 200 bar).

A devices 6 for the injection of $H_2O_2$ at a temperature near room temperature and at a pressure above 20 MPa (about 200 bar) is provided between the kneader-extruder 1 and the dynamic mixer 2.

The purpose of the dynamic mixer 2 is to maintain the melt in the best conditions for its final extrusion and foaming which will take place at the die outlet 7, provided at the outlet end of the final extrusion head 8. In the dynamic mixer 2, the dilution of the melt with ethanol and the dissolution of $CO_2$ in the melt are continued. Cooling of the melt by means of an exchanger-assisted cooling device shown schematically by cooling steps 9, 10, 11 and 12, also takes place in said dynamic mixer 2.

Final extrusion head 8 and its die 7, as well as the conveyor 13 for discharging foam 14, do not form part of the invention and are therefore to be considered as being of the conventional type.

In the embodiment shown, a first static mixer 15 and a second static mixer 16, which serve to reinforce the homogenising action of the kneader-extruder 1 and dynamic mixer 2, are inserted immediately downstream of the kneader-extruder 1 and immediately downstream of the dynamic mixer 2, respectively.

Figure 2:
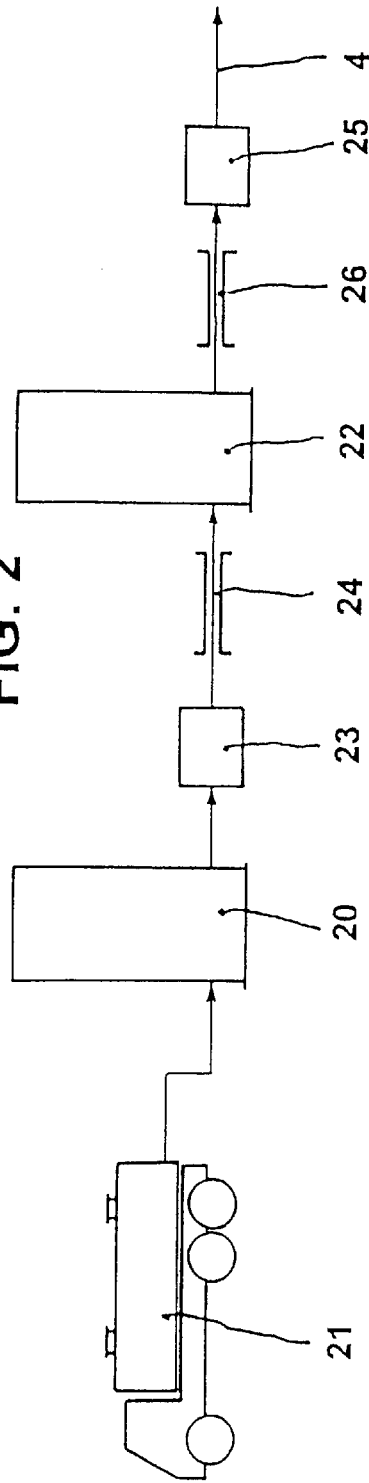

In this kind of apparatus, it has been found advantageous to use the $CO_2$ conditioning and feeding arrangements of FIG. 2. These arrangements comprise a first tank 20 for receiving $CO_2$ from an external source 21 (the first tank 20 being maintained under pressure and temperature conditions of the same order as those of the external source 21), a second $CO_2$ tank 22 which is maintained under a pressure of about 7 MPa (about 70 bar), and a pump 25 for the injection of $CO_2$, via devices 4, into the kneader-extruder 1 and capable of raising the pressure of $CO_2$ from about 7 MPa (about 70 bar) to about 30 MPa (about 300 bar).

Preferably, the flow of $CO_2$ from the first tank 20 to the second tank 22 is effected by means of another pump 23, downstream of which a heating device 24 is provided which raises the temperature of the $CO_2$ leaving the another pump 23 to about room temperature. The flow of $CO_2$ between the second tank 22 and injection pump 25 passes through a cooling device 26 which lowers the temperature of $CO_2$ to prevent it from being overheated during the pumping of $CO_2$ to kneader-extruder 1, via devices 4. Injection pump 25 is cooled by passing coolant through its head.

EXAMPLES

Example 1

Effect of Using Low-molecular-weight Polystyrene in the Foaming Produced by $CO_2$, Controlled Only by Ethanol

In all Experiments 1–6 indicated below, polystyrene foam is produced by extrusion in the apparatus described above.

The foam obtained at the outlet of the lips of die 7 upon final extrusion of the melt is 630 mm in width and 60 mm in thickness.

In a first series of experiments (Experiments 1 and 2), a polymeric mixture based on conventional polystyrene of molecular weight (Mw) 200,000, melt flow index (MFI) 7.5 and VICAT 50 N (ISO 306 B 50) softening temperature 102° C. is introduced into the kneader-extruder 1 at a flow rate of 400 kg/h. The mixture includes 0.4% talc for regulating the cell size and 2.5% of hexabromocyclododecane as fireproofing agent.

Once the polymeric mixture has been plastified into a melt, 3.0 pph (3.0 parts by weight for every 100 parts by weight of polymeric mixture) of the blowing agent $CO_2$ and 4.1 pph of ethanol as the only control agent are injected into the melt.

The foams produced are just acceptable.

In a second series of experiments (Experiments 3 and 4), conventional polystyrene is replaced with polystyrene of molecular weight (Mw) 130,000 (SEC), melt flow index (MFI) 200° C.-5 kg (ISO 1133 H) 23 and VICAT 50 N (ISO 306 B 50) softening temperature 101° C.

It is noted that the pressures in the kneader-extruder 1 and the dynamic mixer 2 decrease but that the pressure in the final extrusion head 8 is maintained, as desired, above the critical pressure of $CO_2$.

Compared with Experiments 1 and 2, the foams from Experiments 3 and 4 exhibit a more smooth and even extrusion skin over the entire surface which is of better quality, without any deterioration of the other technical features.

In a third series of experiments (Experiments 5 and 6), the same low-molecular-weight polystyrene as in Experiments 3 and 4 of the second series was used, and the amount of control agent (ethanol) was lowered to 3.1 pph. As can be seen from Table 1 (Experiments 5 and 6), the pressures increase and reach the same order of magnitude as those observed in Experiments 1 and 2. It should be noted that the extrusion reference temperature, taken at the final extrusion head 8, is of the same order of magnitude.

Under these new conditions (less amount of control agent), the same good foam features (including good extrusion skin quality) as those observed in the second series of experiments are obtained.

The results obtained in the experiments are summarised in Table 1.

TABLE 1

| EXPERIMENT | $CO_2$ pph | EtOH pph | $P_1$ (MPa) | $P_2$ (MPa) | $P_3$ (MPa) | Ref. temp. ° C. | Skin quality | Density |
|---|---|---|---|---|---|---|---|---|
| 1 | 3.0 | 4.1 | 15.3 | 11.6 | 8.5 | 109 | A | 40.2 |
| 2 | 3.0 | 4.1 | 14.7 | 11.5 | 8.1 | 107 | A | 40.0 |
| 3 | 2.8 | 4.0 | 11.7 | 11.3 | 8.1 | 111 | B | 37.4 |
| 4 | 2.9 | 4.1 | 12.6 | 11.5 | 8.2 | 112 | B | 38.6 |
| 5 | 3.2 | 3.1 | 14.3 | 12.7 | 8.4 | 109 | B | 39.9 |
| 6 | 3.2 | 3.1 | 13.2 | 12.7 | 8.2 | 108 | B | 39.2 |

$P_1$=pressure in the kneader-extruder 1.
$P_2$=pressure in the dynamic mixer 2.
$P_3$=pressure in the final extrusion head 8.
Ref.temp.=Extrusion reference temperature, taken at the final extrusion head.
Skin quality: A=Acceptable. Skin fairly even without holes.
B=Good. Even and smooth skin.

From the results given in Table 1, it can be deduced that the use of low-molecular-weight polystyrene gives foams of better quality than those obtained with conventional polystyrene, maintaining lower pressures (Experiments 3 and 4) in the kneader-extruder 1 ($P_1$), without lowering the pressures ($P_3$) in the final extrusion head 8, which would be undesirable.

Example 2

Effect of using [$CO_2$+ethanol] and [$CO_2$+ethanol+ $H_2O_2$]

All Experiments 7–13 given below were carried out under the same conditions as those described in the first paragraph of Example 1 above. The tested products have the thicknesses indicated in Table 2 below.

A first series of experiments (Experiments 7–10) was carried out using conventional polystyrene (Experiments 7 and 8) and low-molecular-weight polystyrene (Experiments 9 and 10), using ethanol as the only control agent.

In a second series of experiments (Experiments 11–13), a mixture of polystyrene of molecular weight (Mw) 130,000 (SEC), melt flow index (MFI) 200° C.-5 kg (ISO 1133 H) 23 and VICAT 50 N (ISO 306 B 50) softening temperature 101° C., 0.6% of talc for regulating the cell size and 2.5% of hexabromocyclododecane as fireproofing agent is introduced into the kneader-extruder 1 at a flow rate of 450 kg/h.

Once the polymeric mixture has been plastified into a melt, 3.5 pph (3.5 parts by weight for every 100 parts by weight of polymeric mixture) of the blowing agent $CO_2$, from 1 to 1.1 pph of ethanol and from 0.4 to 0.45 pph of $H_2O_2$ are injected.

The extruded polystyrene foam obtained according to Experiments 11–13 exhibits an even extrusion skin of good quality with a percentage of closed cells above 95%. The self-extinction coefficient of the foam thus obtained is very more favourable than in the samples obtained using only ethanol as the control agent (Experiments 7–10), as shown in Table 2 below. Likewise, they exhibit better dimensional stability when the foam is subjected to high temperatures.

TABLE 2

|  | 7 | 8 | 9 | 10 | 11 | 12 | 13 |
|---|---|---|---|---|---|---|---|
| Mw PS (1) | 200,000 | 200,000 | 130,000 | 130,000 | 130,000 | 130,000 | 130,000 |
| Thickness (mm) | 40 | 50 | 40 | 50 | 50 | 40 | 40 |
| $CO_2$ pph | 3.3 | 3.3 | 3.3 | 3.5 | 3.5 | 3.5 | 3.5 |
| Ethanol pph | 4.2 | 4.2 | 3.4 | 3.1 | 1.0 | 1.1 | 1.0 |
| $H_2O_2$ pph | 0 | 0 | 0 | 0 | 0.45 | 0.4 | 0.4 |
| $P_1$ (MPa) | 14.7 | 15.2 | 12.3 | 13.8 | 14.7 | 13.9 | 14.8 |
| $P_2$ (MPa) | 13.4 | 13.4 | 10.2 | 11.3 | 15.0 | 11.9 | 12.0 |
| $P_3$ (MPa) | 8.2 | 8.2 | 7.7 | 8.1 | 8.8 | 8.9 | 8.7 |
| Ref. temp. (° C.) | 112 | 112 | 115 | 114 | 112 | 113 | 114 |
| Density (kg/m$^3$) | 38.2 | 38.8 | 41.0 | 41.2 | 38.4 | 36.4 | 36.8 |
| % Closed cells (2) | 95.7 | 95.0 | 96.1 | 97.5 | 98.4 | 96.4 | 96.6 |
| Dimens. stabil. (3) |  |  |  |  |  |  |  |
| Ext. | −6.8 | −4.9 | −6.6 | 2.0 | −3.5 | −4.1 | −3 |
| Trans. | −6.5 | −7.0 | −6.7 | −10.3 | −4.9 | −2.4 | −1.5 |
| Th. | −6.7 | −9.5 | −3.8 | −8.8 | −2.3 | −0.4 | 0 |
| Self-ext. coef. (4) |  |  |  |  |  |  |  |
| Flame height | 16.5 | 18.0 | 15.0 | 15.0 | 9.0 | 8.0 | 10.0 |
| Time | 17.5 | 16.0 | 14.0 | 14.0 | 10.5 | 10.9 | 10.7 |

(1)=Molecular weight of polystyrene (2)=Micromeritics apparatus (3)=Dimensional stability measured after 30 days; the test specimens are subjected to 70° C. for 2 days. Ext.= Direction of final extrusion; Trans.=Transverse direction; Th.=Direction of thickness (4)=Self-extinction coefficient measured one hour after production.

In the test for determining the self-extinction coefficient, the following protocol was used:

Number and Size of the Test Specimens:

4 test specimens of size 90 mm×190 mm were cut from the board to be tested. The thickness of the test specimen is that of the original board of up to 60 mm. The boards of more than 60 mm in thickness are cut to boards of 60 mm in thickness.

Test Procedure:

The test specimen is attached to a support. A burner is used and its flame height is adjusted to 20 mm, the burner being moved in a horizontal direction until the flame is at a distance of 15 mm from the rear face of the test specimen. After 15 seconds, the burner is removed. This is followed by measuring the maximum height the flame reaches (on the rear face of the test specimen) and the time it takes the flame to become extinguished, both before and after the burner is removed.

Example 3

Effect of Feeding Excess $H_2O_2$

A mixture of low-molecular-weight polystyrene and additives, as in Example 2 above, is fed into the apparatus (Experiments 11–13).

3.5 pph of the blowing agent, $CO_2$, 1 pph of ethanol, as the first control agent, and 1 pph of $H_2O_2$ as the second control agent are injected.

Once the process has stabilised, the amount of $H_2O_2$ is steadily increased. As soon as this amount reaches 3 pph, the process starts to destabilise. The pressure in the kneader-extruder 1 begins to vary widely between 10 and 15 MPa (about 100 and 150 bar). It is then noted that the current of the motor of the dynamic mixer 2 also varies. These variations indicate that the melt is not homogeneous because the blowing and control agents are not being incorporated properly into the melt.

After adding $H_2O_2$ at 3 pph for 30 min., holes begin to appear on the foam surface caused by pockets of gas or unmixed control agents. The foam then becomes destabilised and its width varies constantly, and regions of hard material which has rapidly solidified begin to appear, possibly also due to the pockets of gas or control agent.

The amount of $H_2O_2$ is lowered to 2,5 pph, and the process gradually stabilises.

Example 4

Effect of Omitting $H_2O_2$ and of Feeding Excess Ethanol

A mixture of low-molecular-weight polystyrene and additives, as in Example 3 above, is fed into the apparatus.

3.5 pph of the blowing agent $CO_2$ and 4.5 pph of the control agent ethanol are injected.

This melt is extruded through the lips of final extrusion die 7, giving a foam of 630 mm. The thickness of this foam at the outlet of the die gauge, measured with a slide calliper at 3 points along its width, is on average 51 mm. When the foam reaches the cutter conventionally placed downstream of die 7 (time elapsed 15 min.), the thickness is again measured over the entire board width, giving an average value of 47 mm. Thus, the thickness has diminished by 4 mm.

The amount of ethanol is increased to 7 pph and that of $CO_2$ is decreased to 2.5 pph. The thickness is again measured at the outlet of the die gauge and when the foam reaches the cutter. Under these conditions, the thickness has diminished by as much as 9 mm.

The experiment is continued, feeding in no more of the blowing agent $CO_2$ and injecting only ethanol, at 9 pph. After 30 min., a change in the foam structure is observed. At a glance, the cell size is seen to be much larger than in all of the preceding experiments. The board thickness has increased to 55 mm at the outlet of the die gauge. However, upon reaching the cutter (time elapsed 15 min.), the board has a thickness of 26 mm, on average. Thus, the thickness has diminished by 29 mm. Furthermore, when only ethanol is used as the blowing agent, the walls tend to collapse.

The amount of $H_2O_2$ is lowered to 2.5 pph, and the process gradually stabilises.

To those skilled in the art, it will be apparent that many modifications and variations are possible in the practice of the invention described, which are all within the scope defined by the claims given below.

What is claimed is:

1. Process for producing polystyrene foam, said process comprising:

plastifying a mixture of polystyrene with nucleating agents, plasticisers and additives at a pressure and temperature respectively above atmospheric pressure and room temperature to form a melt, suddenly decompressing and cooling the melt to atmospheric pressure and room temperature, on being extruded through a final extrusion die, injecting a blowing agent designed to produce the desired foaming and only consisting of $CO_2$ into the melt so that said blowing agent is dissolved in the melt, and also injecting a first and a second control agents into the melt, the first control agent being designed to dissolve and cool the melt and consisting of ethanol, while the second control agent is only designed to cool the melt and consists of $H_2O_2$, the injected amount of ethanol being such that it is just sufficient for achieving the highest possible dissolution of $CO_2$ in the melt, and the injected amount of $H_2O_2$ being such that the foaming produced by ethanol is minimised.

2. Process according to claim 1, wherein the ethanol is injected into the immediate proximity of the injection point of $CO_2$ and the $H_2O_2$ is injected downstream from that point, when the injections of the blowing agent and the ethanol have already partially cooled the melt.

3. Process according to claim 1, wherein immediately before the final extrusion, the melt to be extruded comprises 2.25–5% by weight of $CO_2$, 0.3–3.0% by weight of ethanol and 0.2–1.7% by weight of $H_2O_2$, the remainder being polystyrene and nucleating agents, plasticisers and additives.

4. Process according to claim 3, wherein immediately before the final extrusion, the melt to be extruded comprises 3.0–4.0% by weight of $CO_2$, 0.6–1.25% by weight of ethanol and 0.25–1% by weight of $H_2O_2$, the remainder being polystyrene and nucleating agents, plasticisers and additives.

5. Process according to claim 1, wherein temperature and pressure profiles of the process are kept at decreasing temperature values in the range of 200 to 100° C. and at decreasing pressure values in the range of 20 to 7.6 MPa respectively, the $CO_2$ always being maintained under supercritical conditions until the final extrusion.

6. Process according to claim 3, wherein the polystyrene has a molecular weight of less than about 150,000, a melt flow index of about 20 g/10 min (ISO 1133H) and a VICAT VST B 50 (according to ISO 306 B 50) softening temperature above 100° C.

7. Apparatus for for producing polystyrene foam, said apparatus comprising a kneader-extruder and a dynamic mixer arranged in series, the kneader-extruder comprises means for effecting initial plastifying of a mixture of polystyene, nucleating agents, plasticisers and additives into a melt and injection of $CO_2$ and ethanol into the melt, and the dynamic mixer being provided with a cooling device for feeding the melt into an extrusion head carrying a final extrusion die, means for injection of $H_2O_2$ located between the kneader-extruder and the dynamic mixer, a first static mixer and a second static mixer inserted respectively immediately downstream of the kneader-extruder and immediately downstream of the dynamic mixer, and the means for the injection of $H_2O_2$ being arranged between the kneader-extruder and the first static mixer.

8. Apparatus according to claim 7, wherein, upstream from the kneader-extruder is located a first tank for receiving $CO_2$ from an external source, the first tank is maintained under pressure and temperature conditions of the same range as those of the external source, a second tank for $CO_2$ maintained under a pressure of about 7 MPa and at room temperature, and an injecting pump for pumping $CO_2$ from the second tank and injecting $CO_2$ into the kneader-extruder and capable of raising the pressure of $CO_2$ from about 7 MPa to about 30 MPa.

9. Apparatus according to claim 8, wherein flow of $CO_2$ from the first tank to the second tank is effected by means of another pump, downstream of which a heating device is provided which raises the temperature of the $CO_2$ leaving the another pump to about room temperature.

10. Apparatus according to claim 8, wherein flow of $CO_2$ between the second tank and the injection pump passes through a cooling device which lowers the temperature of $CO_2$ to prevent $CO_2$ from being overheated during the pumping operation.

11. Apparatus according one of claim 8, wherein the injecting pump is a cooled one.

12. Apparatus according to claim 11, wherein the cooling of the injecting pump is effected by cooling a pump head.

13. Process for producing polystyrene blocks or boards, said process comprising the steps of:

a) plastifying into a melt a mixture of polystyrene with nucleating agents, plasticisers and additives in a kneader-extruder, the polystyrene having a molecular weight of less than about 150,000, a melt flow index of about 20 g/10 min (ISO 1133H) and a VICAT VST B 50 (according to ISO 306 B 50) softening temperature above b) injecting into the melt, in the kneader-extruder, $CO_2$ and ethanol, at a pressure of about 20 MPa;

c) transferring the melt from the kneader-extruder to a first static mixer and injecting $H_2O_2$ into the melt between the kneader-extruder and the first static mixer;

d) homogenising the melt in the first static mixer;
e) transferring the melt from the first static mixer to a dynamic mixer, in which homogenisation is accompanied by a decrease in the temperature and the pressure to which the melt is subjected;
f) transferring the melt from the dynamic mixer to a second static mixer, in which the decrease in the temperature and the pressure to which the melt is subjected continues;
g) transferring the melt from the second static mixer to a final extrusion head, in which the temperature and pressure are controlled so that they remain close to about 100° C. and 7.6 MPa, respectively, the $CO_2$ always being maintained under supercritical conditions until the final extrusion;

at the time of the final extrusion, the melt comprises 2.25–5% by weight of $CO_2$, 0.3–3.0% by weight of ethanol and 0.2–1.7% by weight of $H_2O_2$, the remainder being polystyrene and nucleating agents, plasticisers and additives.

* * * * *